A. B. LANDIS.
CUTTER HEAD.
APPLICATION FILED JAN. 6, 1919.
1,344,908.
Patented June 29, 1920.
2 SHEETS—SHEET 1.
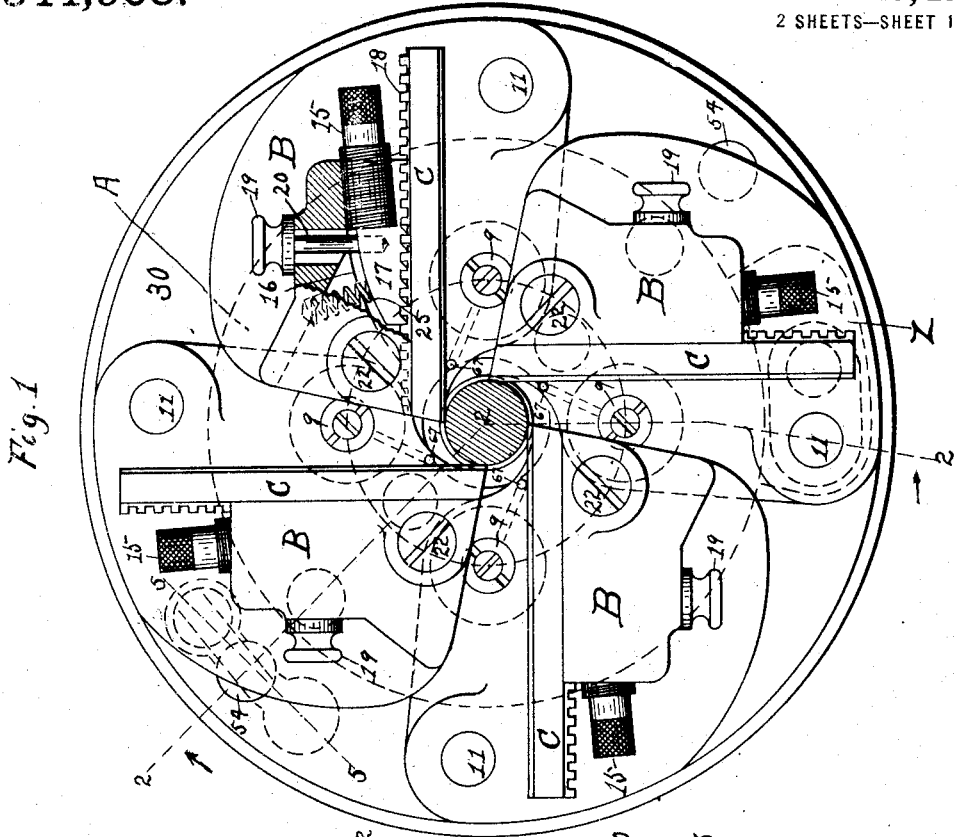
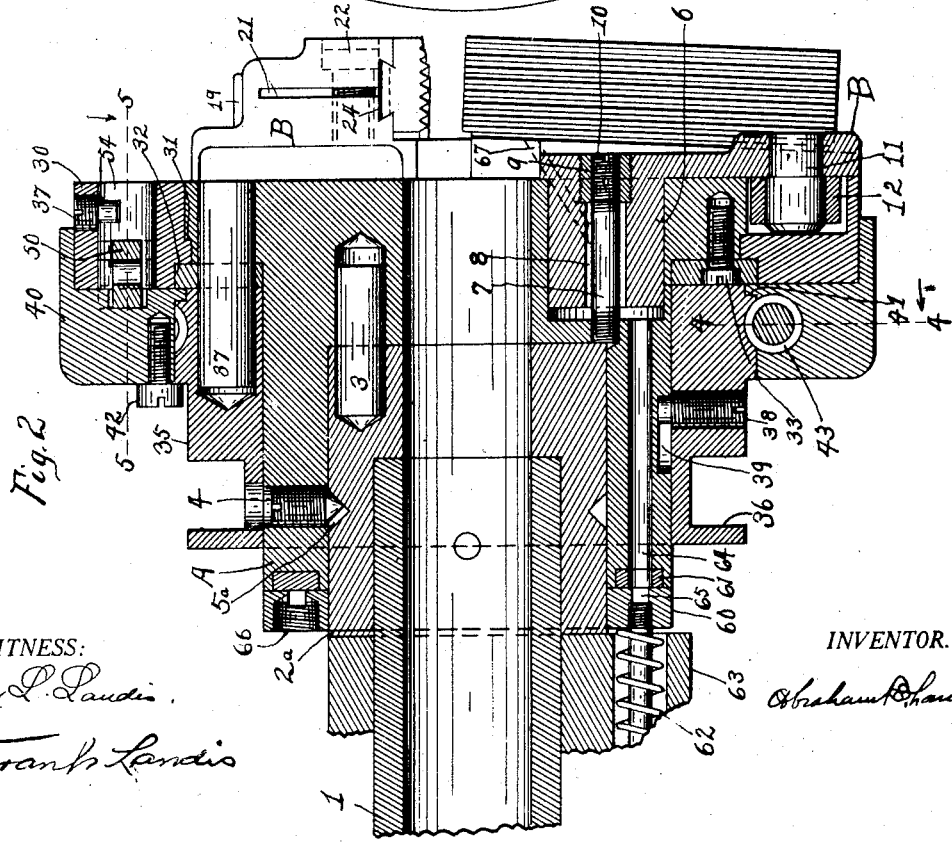
WITNESS:
Harry L. Landis.
F. Frank Landis
INVENTOR.
Abraham B. Landis A. B. LANDIS.
CUTTER HEAD.
APPLICATION FILED JAN. 6, 1919.
1,344,908.
Patented June 29, 1920.
2 SHEETS—SHEET 2.
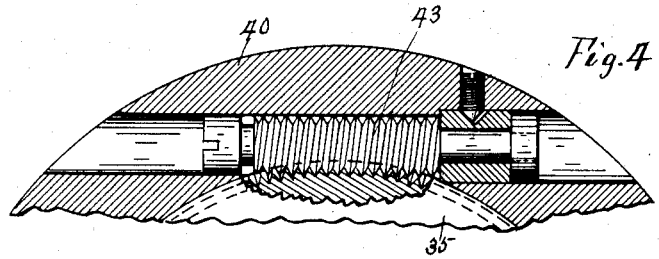
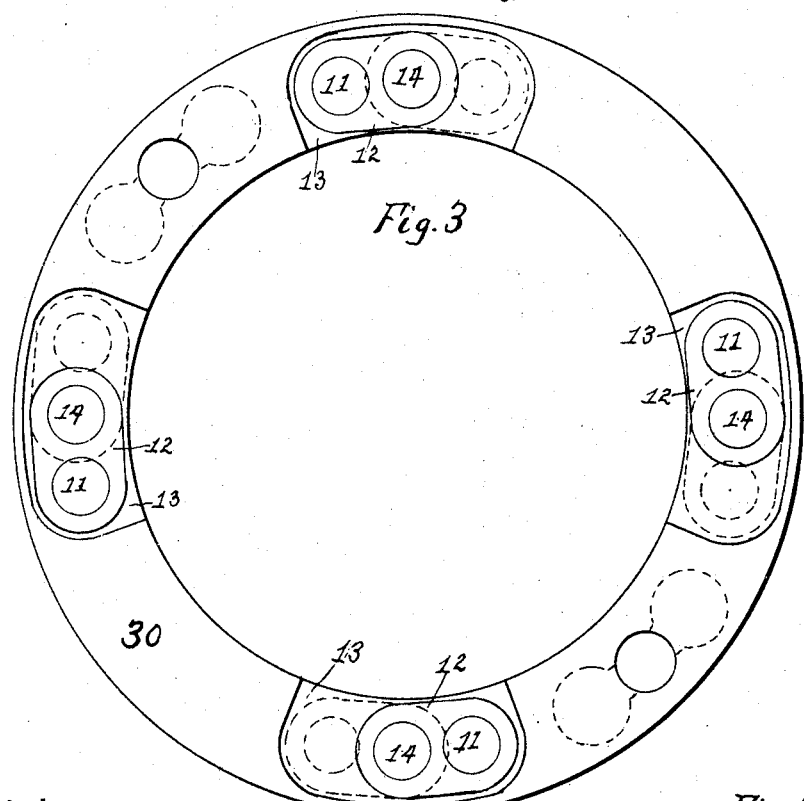
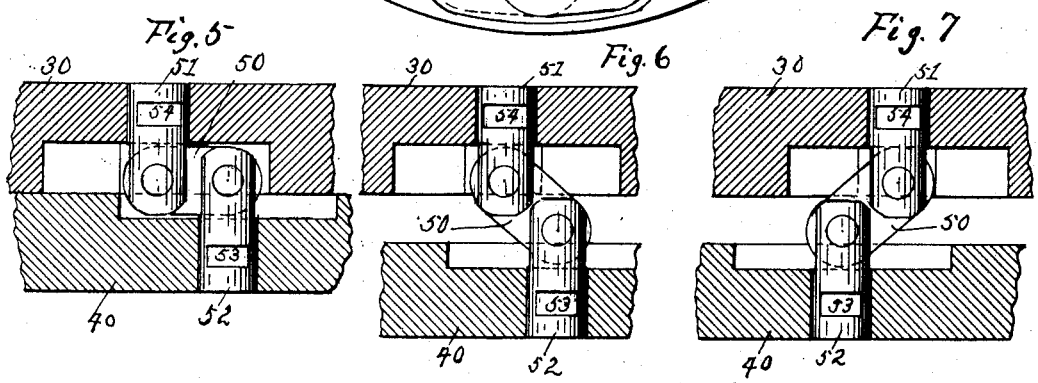
WITNESS:
INVENTOR.

UNITED STATES PATENT OFFICE.

ABRAHAM B. LANDIS, OF ENFIELD, PENNSYLVANIA, ASSIGNOR TO LANDIS MACHINE COMPANY, OF WAYNESBORO, PENNSYLVANIA, A CORPORATION OF PENNSYLVANIA.

CUTTER-HEAD.

1,344,908.

Specification of Letters Patent. Patented June 29, 1920.

Application filed January 6, 1919. Serial No. 269,835.

*To all whom it may concern:*

Be it known that I, ABRAHAM B. LANDIS, a citizen of the United States, residing at Enfield, in the county of Montgomery and State of Pennsylvania, have invented certain new and useful Improvements in Cutter-Heads, of which the following is a specification.

My said invention consists in various improvements, its arrangements of parts and details of construction of cutter heads more especially for cutting screw threads, whereby a cutter head for the purpose is attained that is of durable and rigid construction, one wherein the cutting die can be conveniently and accurately adjusted for different sizes of work and readily opened and closed, wherein the adjusting, securing and releasing of the cutter in its holder can be accomplished with ease and rapidity, also forming a cutter head which completely excludes cuttings from the working parts, all as will be hereinafter fully described and claimed.

Referring to the accompanying drawings which are made a part hereof and on which like reference characters indicate like or same parts—

Figure 1 is a face view of the cutter head showing the cutter holders and the cutters secured thereto with their arrangement.

Fig. 2 is a longitudinal cross section of the cutter head taken on line 2—2 of Fig. 1.

Fig. 3 is a detail of the main die controlling ring.

Fig. 4 is a section on line 4—4 of Fig. 2.

Figs. 5, 6 and 7 are sections taken on line 5—5 of Figs. 1 and 2 showing the different positions with cutting die opened and closed.

In the said drawings the portions marked A represent the body of the cutter head, B the cutter holder, and C the cutters.

The body A is formed with bearings in its face, in which the cutter holders are pivoted equidistant and is mounted on a spindle 1 of a machine in any approved manner. In the drawing however, it is secured to a sleeve 2ª which can be however made an integral part of said spindle. It is mounted on said sleeve 2ª, which is secured to the spindle, by an enlarged perforation adapted to fit over said sleeve and secured against rotary movement thereon by two pins 3 (only one of which is shown in Fig. 2) engaging in an aperture in the end of said sleeve and in the body and against lateral movement by a screw 4 through an aperture in the body and engaging a groove 5ª in the sleeve 2ª by a point thereon bearing on one side of the groove holding the body firmly against the end of the sleeve. The rear portion of the body is of less diameter than the front or face. On the front portion is mounted a ring 30 secured against lateral movement and flush with the face of the body but free for circular movement, which will be later referred to.

The cutter holders B have trunnions integral therewith which are fitted into bearings formed around the center of the body in its face. The holders form a side projection from their trunnions and having a flange give a good surface which being machined at right angles and true with its trunnion forms a substantial bearing surface against the face of the body as an adequate support against the thrusts produced by the cutters doing their work. They are secured to the face of the body by studs 7 which extend through a hole 8 in the center of the trunnion 6, said stud 7 being secured to the body at its inner end. A shoulder in the hole 8 at the outer end provides for holding the cutter holder against the face of the body by means of a sleeve nut 9 screw threaded on stud 7 which is locked into position by a screw plug 10 jammed against the end of stud 7. These cutter holders have each a stud 11 secured at their outer extremity and substantially on the opposite side of trunnion from the cutting point.

The studs 11 engage with links 12 which are located in recesses 13 (see Fig. 3) in ring 30 which is mounted on the body A, said ring having studs 14 secured thereto on which the other end of links 12 are fitted making a connection between said ring and cutter holders by which a circular movement of said ring in one direction serves to open the cutter head or die and the opposite direction to close it. The means of operating same being later described. Each holder B is provided with a dovetailed recess 24 for the reception of the cutter C. Adjacent to said recess is a screw threaded perforation for the reception of a screw plug 15, a slot 16 is also formed adjacent to said recess extending through and beyond the said perforation for the reception of a block 17 formed with shoulders on its under side, engaging with cross slots 18 on the back of cutter C, a stem 19 passing through a slot 20 engages with the block 17 by which said block can be raised from the slots in the cutter to admit of its free removal by sliding same endwise, and a spring 25 serves to hold same in normal engagement with said cutter. The screw plug 15 engages the block 17 by which it is moved to adjustment for proper position of cutter C for cutting, said block 17 due to its engagement with the slots 18 carries the cutter with it. The slot 20 is of such length to permit the movement of the block a little more than the distance the slots in the cutter are spaced so that when the block is moved to the one extreme by the plug 15 the block can be raised and the screw plug returned to take hold of the next slots as will be understood. The holder has a slot 21 cut in its forward end joining with the slots 16 for the purpose of making a slight yielding to this part. A screw 22 inserted in a hole in this holder which is screw threaded on the inner side of slot 21, enlarged on the outer side and countersunk for the head of the screw 22 and serves to clamp said cutter against movement, the screw plug 15 making a positive holding of the cutter C against the thrust of cutting.

The cutter C is of a well known type which has thread forming grooves upon one face of it extending longitudinally the entire length thereof and is kept sharp by grinding upon the end maintaining a perfect cutter until almost its entire length is used, making long life thereto requiring no further description.

The ring 30 mounted on the body for oscillation to open and close the die and attain all sizes of work to be cut, is secured against lateral movement in one direction by a shoulder 31 on the body and a corresponding one on the interior of the said ring, and a ring 32 fitting around the body and secured thereto by screws 33 forming a shoulder securing said ring in the opposite direction.

A ring or sleeve 35 is fitted over the rear part of body A and has an annular groove 36 for the purpose of engaging with it any approved form of fork connection to move it longitudinally on the body when same is revolving, being free to move longitudinally but not circumferentially which is prevented by pins 37 secured in the body A the other end of which is made to slide freely in the perforation in said ring or sleeve 35. These pins take the circular thrust forming the support maintaining the size of the cutting die as may be seen by further observation. On said ring or sleeve 35 is mounted another ring 40 which is secured against longitudinal movement in one direction by a shoulder 41 and in the other direction by screws 42. It is circumferentially and adjustably secured to sleeve 35 by means of a tangential screw 43 (see Fig. 4) which requires no description. The object of this screw is to adjust the cutter holders to secure the correct size of the die as may be required. Said rings 40 and 30 are connected by one or more links 50 (see Figs. 2, 5, 6 and 7). These links are pivoted with bifurcated studs or pins 51 and 52 one of which is secured for slight rotation but against end movement in ring 30 and the other one similarly secured in ring 40. They are held against end movement by a screw 37 in ring 30 and a similar one in ring 40 not shown. These screws engage with notches 54 and 53 in the studs 51 and 52 which secure their lateral movement, the notches permitting of the slight rotation of said studs required as will be seen.

It will be noted in Fig. 5 the rings 30 and 40 are together the same as shown in Fig. 2 which is the closed position of the die. This position causes link 50 to stand at right angles to the studs 51 and 52 causing a lock of the die as will readily be understood. In moving ring 40 away from ring 30 the position shown in Fig. 6 is attained which due to the radial movement of the link 50 causes slight rotation of ring 30 to which are attached the cutter holders and this gives the open position of the die as will be observed. Moving the ring 40 against 30 again closes same into locked position as stated.

Fig. 7 is the same as Fig. 6 but in reverse position, the object of which is to rotate the ring 30 in the opposite direction in case of using the cutter head for left hand screw threading, in which case reverse hand cutter holders must be employed. In order to bring these links into the reverse position, screw 38 must be released far enough for its inner end to escape the recess 39 in the body A allowing the sleeve 35 to move back far enough for link 50 to swing to the other side returning said sleeve 35 to again engage said recess 39 with screw 38 which will be clear. The object of said recess 39 and screw 38 engaging therewith is to limit the rearward movement of sleeve 35 so that the die may not be opened more than necessary as well also as to prevent the link 50 from locking the head or die in an open position as may be seen.

The ring 30 in Fig. 3 shows the four links 12 pivoted thereto on pin 14. They are shown in one position in full lines and the reverse position in dotted lines. One position being for right hand screw cutting and the other for left hand work. The object of this reversal is to keep the recess 13 in which the links 50 are located under the flange of the cutter holder for both hands of cutting to keep it covered for all operations and excluding the cuttings therefrom. Note same at position Z on Fig. 1 shown in dotted lines.

A ring 60 is mounted on the sleeve 2ª of the spindle 1 having an annular groove 65 in its face which bears against a fiber ring 61 located in an annular recess or groove on the rear of the body A by means of springs 62 preferably two in number, located in seats in the bearing 63 of the machine. Said ring has an opening 66 on the opposite side from the groove for a pipe connection. Holes 64 communicate from said grooves 65 through the body A to the bearings for the trunnions 6 of the cutter holders B. An annular space around stud 7 forms a passage to the under side of the threaded sleeve 9. A diagonal hole 67 from this passage, through the cutter holder makes a passage to deliver cutting lubricant to the cutting point of each cutter, said hole forming a jet for the lubricant.

Having described the parts and arrangement of same, I will briefly recapitulate the operation of the cutter head. The die being closed as shown in Figs. 1 and 2 the method of opening is by the rearward movement on the body A of the sleeve 35 carrying mounted thereon the ring 40 which causes said ring 40 to part from ring 30 which being connected together with links 50 causes ring 30 to have a slight rotation because of sleeve 35 being connected to the body against rotation which being connected to each of said cutter holders by the links 12 said slight rotation operates, through tilting the cutter holders on their trunnions to open the die and it is therefore obvious that the opposite motion of sleeve 35 will operate to close the die.

Having now fully described my said invention what I claim as new and desire to secure by Letters Patent is:

1. A cutter head comprising a body, cutter holders pivotally secured on the face of said body, cutters mounted in said holders forming a cutting die, a ring mounted on said body, said ring connected with each of said cutter holders by pivotal links and means for moving said rings circumferentially for opening and closing said die.

2. A cutter head comprising a body, cutter holders pivotally secured on the face of said body, cutters mounted in said holders forming a cutting die, a ring mounted on said body, said ring connected with each of said cutter holders by pivotal links, means for moving said ring circumferentially for opening and closing said die and means therewith for adjusting the size of said die.

3. A cutter head comprising a body, cutter holders mounted on the face of said body, cutters mounted in said holders forming a cutting die, a ring mounted on said body, pivotal links connecting said ring with each of said holders, said ring mounted to move circumferentially on said body, another ring mounted to move longitudinally with said body, and connected by a link to said first named ring by which in its longitudinal movement said first named ring is caused to move a limited amount circumferentially to open and close the said die.

4. A cutter head comprising a body, cutter holders mounted to move on said body, cutters mounted in each of said cutter holders forming a cutting die, a ring mounted on said body and connected with each of said cutter holders by a link connection, means to move said ring circumferentially for opening and closing said die and means therewith for adjusting the size of said die.

5. A cutter head comprising a body, cutter holders pivoted on the face of said body, cutters mounted in said holders forming a cutting die, a ring mounted on said body, pivoted links connecting said holders with said ring at a point substantially opposite its pivot from the cutting point of said cutters.

6. A cutter head comprising a body, cutter holders mounted on said body, a ring mounted on said body, links connecting each of said cutter holders with said ring, another ring mounted on said body to move longitudinally but not circumferentially therewith, still another ring mounted upon said last named ring secured thereto in circumferential adjustment, a link connecting said last named ring with the first named ring, to which the cutter holders are connected by which a limited circumferential movement is given to said first named ring.

7. A cutter head comprising a body, cutter holders mounted to move on said body, cutters secured to said holders by a dovetailed connection, said holder being formed with a dovetailed recess, a screw threaded perforation adjoining said recess, a screw threaded plug in said perforation, a holding block seated in a slot adjacent to said recess having holding edges engaging with cross grooves in the back of said cutter, said screw plug engaging with said holding block for the purpose of longitudinal adjustment of the said cutters and securing same against end movement.

8. A cutter holder with cutters mounted thereon having longitudinal screw thread forming grooves on the face thereof, a longitudinal projection on the back of said cutters forming a dovetail, said dovetail fitting in a dovetailed recess in said cutter holder, said cutter having cross grooves in its back, a slot in said cutter holder adjacent to said dovetailed recess, a screw threaded portion in said slot, a screw threaded plug in said screw threaded portion, a block in said slot having shoulders engaging with said cross grooves in said cutter, means for raising said block to allow the removal of said cutter, and means for normally holding said block in engagement with said grooves.

9. A cutter holder having a dovetailed recess for the engagement of a cutter fitting thereto, a holding block engaging with said cutter to hold same from longitudinal movement, a screw threaded plug in said holder, said plug engaging with said holding block, a slot in said holder to permit of yielding, a perforation crossing said slot, a screw inserted in said perforation by which said cutter is firmly clamped on its dovetailed connection.

10. A cutter head comprising a body, cutter holders movably secured to said body, cutters mounted in said holders to form a cutting die; a ring mounted on said body, means for connecting said ring to said cutter holders, another ring mounted on said body secured against circumferential movement but free to move longitudinally, a ring mounted upon said last named ring, means for securing said rings together and provide for circumferential adjustment between them for the purpose of adjusting the size of the die, and means whereby said last named ring in its longitudinal movement causes the first named ring to move circumferentially.

11. A cutter holder having a cutter mounted thereon, said cutter having holding grooves across its back, a block having a holding edge adapted to engage with said grooves, a screw plug engaging a screw threaded perforation in said holder, said screw plug engaging said block for the purpose of lonitudinal adjustment of said cutter and to hold same against longitudinal movement.

12. A cutter holder having a cutter secured thereon, said cutter having holding grooves across its back, a block adapted to engage with said grooves, a screw plug engaging a screw threaded perforation in said holder, said screw plug engaging said block for the purpose of longitudinal adjustment of said cutter and to hold same against end movement, means for raising said block from engagement with said cutters for the purpose of freely removing said cutter and means for normally holding said block in engagement therewith.

13. A cutter holder, a cutter secured thereto having longitudinal thread forming grooves on their face, with transverse holding grooves on their back, a holding block seated in a slot in said holder engaging with the transverse grooves of said cutter, a screw plug engaging with said block for the purpose of adjusting and holding said cutter against longitudinal movement; means for releasing said block from said cutter for the free removal of said cutter, means for holding said block normally in engagement with said cutter and means for rigidly clamping said cutters.

14. In a cutter head, a cutter holder, a cutter having longitudinal cutting grooves on its face, a longitudinal dovetailed raised portion on its back, a dovetailed recess in said cutter holder in which said dovetailed portion of said cutter fits, cross holding grooves on the back of said cutter, a slot in said holder adjacent to its recess, a holding block seated in said slot and in engagement with the cross grooves of said cutter, a screw plug in screw threaded engagement with said holder, said plug engaging with said block for holding said cutter against longitudinal movement, means for raising said block out of engagement of said cutter, means for normally holding same in engagement therewith, a slot in said holder to produce a yielding of same between the sides of said dovetailed recess, and a screw for clamping said cutter upon said dovetail portion.

15. A cutter head comprising a body, cutter holders movably secured to the face of said body, a ring mounted on said body, links connecting said ring with each of said holders, a longitudinally movable ring on the body, a connection between said longitudinally movable ring and said first named ring, whereby said first named ring is moved circumferentially by the longitudinal movement of said last named ring, and means for securing said last named ring against circumferential movement.

16. A cutter head comprising a body, cutter holders pivotally secured to said body, cutters secured to said holders forming a cutting die, a ring on said body, said ring connected with each of said cutter holders by a pivotal link connection, said ring having a circumferential movement, another ring mounted on the said body secured against circumferential movement but free to a limited longitudinal movement, said last named ring having another ring mounted on it and secured to same in circumferential adjustment, said last named ring connected with the first named ring by a link by which means the limited circumferential movement of the said first named ring is produced and by which the said die is caused to open and close.

17. A cutter holder having a cutter secured thereon, said cutter having holding grooves across its back, a block adapted to engage with said grooves, a screw plug, engaging screw threads in said holder, said screw plug engaging said block for the purpose of longitudinal adjustment of said cutter, and to hold same against longitudinal movement.

18. A cutter head comprising a body, cutter holders pivoted in said body, cutters mounted on said holders, a ring mounted on said body, means for connecting said ring with said holders at a point on substantially the opposite side of said pivot from the cutting point of said cutter.

In testimony whereof I affix my signature in presence of two witnesses.

ABRAHAM B. LANDIS.

Witnesses:
HENRY T. RULLMANN,
WM. E. GUERTLER.